US011638178B2

(12) United States Patent
Mehta et al.

(10) Patent No.: US 11,638,178 B2
(45) Date of Patent: *Apr. 25, 2023

(54) METHOD AND SYSTEM FOR SMART OPERATING BANDWIDTH ADAPTATION DURING POWER OUTAGES

(71) Applicant: DISH Wireless L.L.C., Englewood, CO (US)

(72) Inventors: Dhaval Mehta, Aldie, VA (US); Farhad Bassirat, Arlington, VA (US); Siddhartha Chenumolu, Ashburn, VA (US); Amit Pathania, Herndon, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,349

(22) Filed: Aug. 3, 2021

(65) Prior Publication Data

US 2021/0385690 A1    Dec. 9, 2021

Related U.S. Application Data

(63) Continuation of application No. 16/891,934, filed on Jun. 3, 2020, now Pat. No. 11,202,234.

(51) Int. Cl.
*H04W 28/20* (2009.01)
*H04W 52/02* (2009.01)

(52) U.S. Cl.
CPC ....... *H04W 28/20* (2013.01); *H04W 52/0206* (2013.01)

(58) Field of Classification Search
CPC . H04W 28/20; H04W 52/0206; H04W 24/02; H04W 24/04; H04W 16/08; H04W 76/15; H04W 88/085; Y02D 30/70

(Continued)

(56) References Cited

U.S. PATENT DOCUMENTS 7,164,667 B2    1/2007  Rayment et al.
10,470,120 B2  11/2019  Fischer
(Continued)

FOREIGN PATENT DOCUMENTS

WO    2020017941 A1    12/2014
WO    2019210946 A1    11/2019

OTHER PUBLICATIONS

5G Americas, "New services & applications with 5G ultra-reliable low latency communications", Nov. 2018. (Year: 2018).
(Continued)

*Primary Examiner* — Tanmay K Shah
(74) *Attorney, Agent, or Firm* — KW Law, LLP (57) ABSTRACT

Systems and methods are provided for adaptive bandwidth (BW) management configuring an element management control unit including a set of distribution/central units (DU/CU) for monitoring power and traffic loads at a plurality of cell sites in a network; communicating with a BW management unit coupled to the element management system to adapt BW for users at cell sites by moving users to a set of smaller bandwidth parts (BWPs) at a cell site in response to a set of conditions of AC power outages and reduced traffic loads detected by the BW management unit, and in response to at least one of the detected conditions, instructing based on data from the DU/CU to the BW management unit to move user traffic to a designated lower BWP of the set of smaller BWPs at the cell site while shutting down other BWPs at the cell site to save the power of an operating cell site.

20 Claims, 6 Drawing Sheets

(58) Field of Classification Search
USPC .......................................................... 455/574
See application file for complete search history.

(56) References Cited

U.S. PATENT DOCUMENTS

| | | |
|---|---|---|
| 10,523,914 B1 | 12/2019 | Phillips et al. |
| 10,868,471 B2 | 12/2020 | Fischer |
| 2006/0182262 A1 | 8/2006 | Goldman et al. |
| 2008/0247760 A1 | 10/2008 | Edmon et al. |
| 2010/0009694 A1 | 1/2010 | Fischer |
| 2011/0034196 A1 | 2/2011 | Jonishi et al. |
| 2013/0094451 A1 | 4/2013 | Pavlovski et al. |
| 2013/0169042 A1 | 7/2013 | Melamed |
| 2014/0128073 A1 | 5/2014 | Farhadi |
| 2014/0293777 A1 | 10/2014 | Dhillon et al. |
| 2014/0357259 A1 | 12/2014 | Tomeczko et al. |
| 2015/0023163 A1 | 1/2015 | Gonzalez et al. |
| 2015/0172115 A1 | 6/2015 | Nguyen et al. |
| 2017/0054595 A1 | 2/2017 | Zhang et al. |
| 2017/0078209 A1 | 3/2017 | Miklos |
| 2017/0201968 A1 | 7/2017 | Nam et al. |
| 2017/0367022 A1 | 12/2017 | Chandrasekaran |
| 2018/0024884 A1* | 1/2018 | Peake .................. G06F 3/0635 714/764 |
| 2018/0206267 A1 | 7/2018 | Islam et al. |
| 2019/0037409 A1 | 1/2019 | Wang et al. |
| 2019/0053193 A1 | 2/2019 | Park et al. |
| 2019/0082326 A1 | 3/2019 | Mathison et al. |
| 2019/0089716 A1 | 3/2019 | Stocker |
| 2019/0132857 A1 | 5/2019 | Babaei et al. |
| 2019/0140904 A1 | 5/2019 | Huang et al. |
| 2019/0182716 A1 | 6/2019 | Futaki et al. |
| 2019/0182752 A1 | 6/2019 | Lou et al. |
| 2019/0223055 A1 | 7/2019 | Bor Yaliniz et al. |
| 2019/0223093 A1 | 7/2019 | Watfa et al. |
| 2019/0246420 A1 | 8/2019 | Park et al. |
| 2019/0253230 A1 | 8/2019 | Loehr et al. |
| 2019/0357260 A1 | 11/2019 | Cirik et al. |
| 2019/0364492 A1 | 11/2019 | Azizi et al. |
| 2020/0059345 A1 | 2/2020 | Pelletier et al. |
| 2020/0084107 A1 | 3/2020 | Li |
| 2020/0169921 A1 | 5/2020 | Zhu et al. |
| 2020/0170022 A1 | 5/2020 | Jones |
| 2020/0221346 A1 | 7/2020 | Part et al. |
| 2020/0229076 A1 | 7/2020 | Jin et al. |
| 2020/0245233 A1 | 7/2020 | Qian et al. |
| 2020/0304406 A1 | 9/2020 | Thubert et al. |
| 2020/0344641 A1 | 10/2020 | Veggalam et al. |
| 2020/0344695 A1 | 10/2020 | Wang et al. |
| 2020/0382386 A1 | 12/2020 | Narendra et al. |
| 2021/0037390 A1 | 2/2021 | Tofighbakhsh et al. |
| 2021/0058473 A1 | 2/2021 | Yerli |
| 2021/0067421 A1 | 3/2021 | Kidd et al. |
| 2021/0068044 A1 | 3/2021 | Chan et al. |
| 2021/0112565 A1 | 4/2021 | Bhaskaran et al. |
| 2021/0136680 A1 | 5/2021 | Browne et al. |
| 2021/0167930 A1 | 6/2021 | Jeon et al. |
| 2021/0203468 A1 | 7/2021 | Yi et al. |
| 2021/0219185 A1 | 7/2021 | Xin et al. |
| 2021/0219222 A1 | 7/2021 | Jia et al. |
| 2021/0235492 A1 | 7/2021 | Iyer et al. |
| 2021/0243232 A1 | 8/2021 | Verma et al. |
| 2021/0243673 A1 | 8/2021 | Miller et al. |
| 2021/0243684 A1 | 8/2021 | Wang et al. |
| 2021/0266831 A1 | 8/2021 | Zhou et al. |
| 2021/0314983 A1 | 10/2021 | Karaki et al. |
| 2021/0329666 A1 | 10/2021 | Ljung et al. |

OTHER PUBLICATIONS

ISA-USPTO, International Search Report issued in IA. No. PCT/US2021/039580 dated Jan. 10, 2022.

ISA-USPTO, International Search Report issued in IA No. PCT/US2021/035616, dated Aug. 30, 2021.

Park, J.H. et al. "A New Traffic Load based Cell Zooming Algorithm in Dense Small Cell environments", IEEE, 2015, pp. 332-337.

\* cited by examiner

METHOD AND SYSTEM FOR SMART OPERATING BANDWIDTH ADAPTATION DURING POWER OUTAGES

CROSS-REFERENCE TO RELATED APPLICATION

This application is a continuation of the parent U.S. patent application Ser. No. 16/891,934 filed on Jun. 3, 2020, and also claims priority to related co-pending U.S. patent application Ser. No. 16/891,991, entitled METHOD AND SYSTEM FOR SLICING ASSIGNING FOR LOAD SHEDDING TO MINIMIZE POWER CONSUMPTION WHERE GNB IS CONTROLLED FOR SLICE ASSIGNMENTS FOR ENTERPRISE USERS filed on Jun. 3, 2020. The content of the above co-pending applications is hereby incorporated by reference in their entirety.

TECHNICAL FIELD

The following discussion generally relates to power management in wireless communications systems. More particularly, the following discussion relates to systems, devices, and automated processes that reduce power drawn by radio frequency (RF) radios based on commercial power interrupts or failures in 5G data networks or the like by smart bandwidth adaptation and traffic loading increasing the operating time of the switched backup uninterruptible power supply (UPS).

BACKGROUND

The 5G data standard and telephone networks were developed to provide greatly improved bandwidth and quality of service to mobile telephones, computers, internet-of-things (IoT) devices, and the like. The high-bandwidth 5G networks, however, face additional challenges that are now being recognized. In part, because of the high bandwidth, the 5G base station is expected to consume roughly three times as much power as the legacy 4G base stations in use. Further, more 5G base stations are needed to cover the same area as the legacy 4G base stations. Hence, not only does each 5G base consume three times the power of the 4G base station, for coverage of the same area more 5G base stations are in use, and as a result, significant increases in power consumption will result.

Further, along with the increases in power usage, in the case of AC power outages, the 5G base stations are required to have a battery backup to ensure service offerings during AC power outages. These battery backup units are expensive, and the cost for the battery backup is in part determined by the amount of power needed and subsequently consumed by the RF radio transmitters and receivers at the 5G base station; which in this case exceeds the legacy 4G base stations by both number in use and the power need for each 5G base station. In these cases in which significant amounts of power are needed and consumed by certain 5G base stations, there is needed several serially or parallelly connected backup power packs that result in multiple-fold cost increases in the eventual configured 5G base stations for each cell site.

Therefore it is desired to provide a solution to smartly change the operating bandwidth (BW) (i.e., the high-bandwidth) at certain cell sites to manage power consumption without causing any cell site interruptions in service. It is desired to reduce the power requirements of all the operating carriers of cell sites in a network, particularly in case of an AC power outage or interruption for enhanced power management efficiencies of each cell site.

It is, therefore, desirable to create systems, devices, and automated processes that can monitor commercial power interrupts and failures and allow different configurations of base station components to operate in the desired cell network. It is also desirable to improve connectivity and the operating time for base station equipment operating in backup power modes using backup batteries at cell sites within 5G or similar networks.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Systems, devices, and automated processes are provided to provide adaptive bandwidth solutions to reduce the power draw of a backup power supply to a cell site in response to a power loss or a light network load at a cell site.

In an exemplary embodiment, a system for adaptive bandwidth (BW) management is provided. The system provides an element management control unit including a set of distribution and central units (DU/CU) to monitor power and traffic loads at a plurality of cell sites in a network; a BW management unit communicating with the element management control unit to adapt BW for users at cell sites in the network by moving users to a set of smaller bandwidth parts (BWPs) at a cell site in response to a set of conditions determined by the BW management unit, the set of conditions including at least one of an AC power outage, and reduced traffic loads at one or more cell sites of the network; and in response to at least one of the determined conditions of an AC power outage, and reduced traffic loads based on data from the DU/CU about the condition to the BW management unit to move user traffic to a designated lower BWP while shutting down other BWPs at the cell site to save power consumption at the cell site.

In various exemplary embodiments, the system includes the BW management unit configured to automatically initialize a set of smaller BWPs at the cell site in response to data received about a loss of power and the reduced traffic loads from the DU/CU monitoring cell sites of the network wherein usage of the set of smaller BWPs does not require a change of a carrier at the cell site. The designated lower BWP is configured as a single carrier based on a prior BWP's carrier and transmissions of related sub-carriers of the network at the cell site are also shut off to reduce power consumption. The system further includes the BW management unit configured to communicate with the radio receiver at a cell site to exchange messages about requirements of elements of the cell site based on operations using smaller BWPs at the cell site to reduce the output power of the radio receiver at the cell site by taking into account data received by the DU/CU indicative of the smaller BWPs operating at the cell site. The system includes the cell site including a gNB node controlled by a radio network with the DU/CU configured to monitor AC power outages and to activate an adaptive BW process at the gNB node. The system includes the DU/CU configured to initiate the moving of user traffic to the designated lower BWPs while shutting down other BWP of an operating carrier at the cell site. The system includes a radio controller at the cell site instructed by the BW management unit, monitoring the users at the designated lower BWPs by data received from the DU/CU of user traffic, to control routing of power from the backup battery and to reduce the power consumed by the cell site by a battery controller to reduce power drawn by the backup battery at the cell site.

In yet another embodiment, a method for adaptive bandwidth (BW) management is provided. The method includes configuring an element management control unit including a set of distribution (DU) and central units (DU/CU) for monitoring power and traffic loads at a plurality of cell sites in a network; communicating with a BW management unit coupled to the element management control unit to adapt BW for users at cell sites in the network by moving users to a set of smaller bandwidth parts (BWPs) at a cell site in response to a set of conditions determined by the BW management unit, the set of conditions including at least one of an AC power outage and reduced traffic loads at one or more cell sites of the network; and in response to at least one of the determined conditions of the AC power outage and reduced traffic loads, instructing by data received from the DU/CU to the BW management unit to move users to a designated lower BWP of the set of smaller BWPs at the cell site while shutting down other BWPs at the cell site to save power consumption at the cell site.

In various exemplary embodiments, the method includes configuring the BW management unit for automatically initializing a set of smaller BWPs at the cell site in response to data received about a loss of power and the reduced traffic loads from the DU/CU that monitors cell sites of the network wherein usage of the set of smaller BWPs does not require a change of a carrier at the cell site. The designated lower BWP is configured as a single carrier based on a prior BWP's carrier, and the transmissions to related sub-carriers at the cell site are also shut off to reduce power consumption. The method includes configuring the BW management unit for communicating with the radio receiver at the cell site to exchange messages about requirements of components of the cell site based on operations using the set of smaller BWPs at the cell site to reduce the output power of the radio receiver at the cell site by taking into account data indicative of the set of smaller BWPs operating at the cell site. The method includes controlling a cell site including a gNB node by a radio network and the DU/CU monitoring data received of an AC power outage and traffic loads at the gNB node to initialize a smaller BWP via an adaptive BW process. The method includes configuring the DU/CU to initiate the adaptive BW process for moving user traffic to the designated lower BWPs while shutting down other BWP in the current operating carrier at the cell site. The method includes instructing a radio controller at the cell site by the BW management unit, monitoring the users at the designated lower BWPs by data received from the DU/CU of traffic loads, controlling the routing of power from a backup battery, and reducing power consumption by the cell site by instructing a battery controller for reducing the draw on the backup battery.

In yet another exemplary embodiment, a computer program product tangibly embodied in a computer-readable storage device that stores a set of instructions that when executed by a processor perform a method for an operational mode of a base station when a power loss or light network load is detected is provided. The method includes: configuring an element management control unit including a set of distribution and central units (DU/CU) for monitoring power and user traffic at a plurality of cell sites in a network; communicating with a BW management unit coupled to the element management control unit to adapt BW for users at cell sites in the network by moving users to a set of smaller bandwidth parts (BWPs) at a cell site in response to a set of conditions determined by the BW management unit, the set of conditions including at least one of an AC power outage, and a light network load at one or more cell sites; and in response to at least one of the conditions, instructing, based on data provided by the DU/CU of the conditions to the BW management unit, to move users to a designated lower BWP of the set of smaller BWPs at the cell site while shutting down other BWPs at the cell site to save power consumed at the cell site.

In various exemplary embodiments, the method includes configuring the BW management unit for automatically initializing a set of smaller BWPs at the cell site in response to feedback from data from the DU/CU monitoring the cell sites wherein the initializing of the set of smaller BWPs does not require a change in an operating carrier used at the cell site. The method includes configuring the BW management unit for communicating with the radio receiver at the cell site to exchange messages about requirements of components of the cell site based on operations using the set of smaller BWPs at the cell site to reduce the power consumed by the radio receiver at the cell site by taking into account data indicative of the set of smaller BWPs operating at the cell site.

The method further includes controlling a cell site including a gNB node of a radio network by data from the DU/CU that enables monitoring of an AC power outage and light network loads at the gNB node to initialize an adaptive BWP process. The method includes configuring the DU/CU to initiate moving of user traffic to the designated lower BWPs while shutting down other BWPs of a carrier at the cell site wherein the designated lower BWP is configured as a single carrier based on a prior BWP, and wherein transmissions to related sub-carriers at the cell site are shut off for power consumption savings. The method includes instructing a radio controller at the cell site by the BW management unit, monitoring the users at the designated lower BWPs by data received from the DU/CU of user movement, for controlling the routing of power from the backup battery for reducing power consumed by the cell site by instructing a battery controller to reduce power drawn by the backup battery that is responsive to executing the adaptive BWP process at the cell site.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

When connecting a 5G base station to the power grid, this does not always guarantee that power is available and provided to the 5G base continuously all the time without interruption because of a plethora of environmental and operating reasons such as accidents, lightning strikes, rolling blackouts, etc. Therefore, for a robust and reliable 5G service made available from a 5G base station, carriers have to build a backup power system. It is the norm to provide backup power to the macrocells in a 5G network, and often the macro level has sufficient service. However, the power-consuming small cell structure requires added power backup that is not usually available in legacy 4G cell tower power deployments. Hence, added backup power is essential to enable the proper functioning of the small cell rollout.

In 5G networks, the RF radio units are required to have a battery backup to ensure service offerings during an AC power outage. The battery backup units are expensive, and the cost for each battery backup is calculated by the power consumed by the radio unit, the backup duration, and how many operating carriers are at a base station or network.

Currently, there are a number of obstacles or drawbacks that prevent optimization of battery backup capacity when a power interrupt or outage occurs. It is a desire that the required battery backup capacity can be optimized as follows:

(1) Shut down Operating carriers: this is not a preferred option, as this impacts the user experience, lack of emergency calls, such as E911, resulting in users canceling their service and switching to operators who have battery backup services; (2) Reduce the operating carrier Bandwidth: this is not easily feasible in current operations as changing the operating carrier BW requires a new cell configuration on the same radio with lower channel BW, and (3) this will also cause service interruption as changing the operating BW will cause the site to restart for the new channel BW to be in effect.

The advanced capabilities of 5G small cells mean added power requirements. Increased data traffic requires more computational power. Although massive MIMO can help improve spectral efficiency, power efficiency is generally lower, and a typical three-sector small cell can require 200-1,000 watts of power.

There is a need to receive power from a large number of small cells in a cost-effective and repeatable way that supports fast and efficient rollouts. The first step involves recognizing that the traditional model for powering macro cell sites does not apply to small cells.

The RF radios and antennas use a fixed input power that is based on full load RF conditions. When commercial power is interrupted, lost, or dramatically reduced, the RF radio is not able to receive notice to modulate its power consumption accordingly. In other words, the RF is not informed, nor is the RF radio configured to be advised of a commercial power loss and can change or drop its preconfigured input power requirements. The inability to change the input power requirements of the RF radio results in lower performance in its operation by causing a faster drain on its battery backup systems.

The 5G New Radio (NR) is the global standard for a unified, capable 5G wireless interface, can deliver a faster broadband experience, and is designed to have an initial bandwidth part (BWP) that is used by all the UE during the initial access and dedicated BWP for a UE or group of UEs that will apply for data allocations. The BWP adaptation is controlled by a gNB node (radio access network (RAN)+ distributed unit (DU)/centralized unit (CU) for 5G). There can be multiple smaller BWP(s) that will be predefined by the operator to be used during AC power outages (i.e., a RAN slicing architecture that has multiple sets of functional splits and function placement in one cell). In an exemplary embodiment, another option is to use a gradual reduction in the operating BWP. For (e.g., to start with only a 25% percent reduction in BW and then gradually move to lower numbers if the power is not restored). With this process, the user experience can avoid degradation in the case of short AC power outages. The network slicing can also be linked to the BWP, during a AC power outage or light network load operations, the minimization of the power consumption gNB can be done by control of the slice and BWP mutual association. For example, the operator can choose to merge all the available slices into the smaller BWP. The operator can choose to define the BWP and slice mapping during an AC power outage when there are multiple BWP defined that are made available during AC power outages The virtualization of the radio access network (RAN) of next-generation (5G) wireless systems enables applications and services to be physically decoupled from devices and network infrastructure. This enables the dynamic deployment of different services by different network operators over the same physical infrastructure. RAN slicing utilizes virtualization allows the operator to provide dedicated logical networks with customer-specific functionality without losing the economies of scale of a shared infrastructure. When implementing these virtual networks, mobile devices and other user equipment can experience challenges in properly connecting and operating in environments where each network provides different "slices" of bandwidth for various quality of service (QoS).

In reconfiguring to 5G base stations, the 4G two-port transceivers have been replaced with four-port radios, enabling the use of multiple-in, multiple-out (MIMO) transmission to improve spectral efficiency. The MIMO enhances signal strength and helps reduce interference. Eight-port radios take beamforming a step further to provide additional efficiency gains. The nascent 5G technology will take full advantage of beamforming by using 16 or 64 transmit/receive chains (16T/16R, 64T/64R) and radio-integrated antennas operating at 2.3 GHz and higher.

Power amplifier efficiency has improved significantly and is due primarily to more sophisticated linearization techniques and higher output power capabilities. However, next-generation "massive MIMO" active antenna unit (AAU) radios will require a large number of lower-power amplifiers for each AAU radio. Linearizing each small amplifier would be costly and marginally effective since the additional circuitry would itself consume much of the power it could save, and therefore is not a feasible solution. In this case, power efficiency could quite possibly take a turn for the worse.

It is desirable to achieve cost savings using intelligent solutions to reduce the power consumption of 5G base stations when operating in a backup power mode while meeting sufficient regulatory operating requirements to prevent a shut-down of the radio transmitter.

It is desirable to limit the number of backup power supplies that are needed for use when operating the 5G base station in a backup power mode for component cost savings, current usage, and efficiency.

It is desirable to provide systems and methods for operating management of base stations components that enable the smart management of power consumption by implementing adaptable bandwidth control and slice offering at cell sites (i.e., nodes) or enabling automated systems to reconfigure components based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to implement processes where the operator can choose to close some slice offerings and continue only higher priority slice(s). The Radio AC power outage detection by DU/CU, DU/CU, or NFMF can also detect AC power outage via FCAPs and activate the solution. During an AC power outage, the RAN will notify the control unit (DU: Distributed Unit or CU: Central Unit). The DU/CU will initiate the moving of all user traffic to the designated lower BWP(s) (e.g., initial BWP) while shutting down all the other BWP in the current operating carrier. Based on the configuration, the DU/CU will move all the users and/or slices to the smaller BWP(s) during an AC power outage or during light network load to minimize power consumption gNB and will notify the users of the change in the assigned BWP. The Users will stop monitoring the current BWP and will immediately start following only the lower BWP.

In a multi-carrier operation, the DU/CU can also move all the traffic to a single carrier based on BWP or slice prioritization configurations. After full power restores or loading on the RAN has increased, gNB can re-activate all the dedicated BWP or slices and move the users seamlessly to their respective BWP or slice(s). The reduced bandwidth assignment to UE in Multi-User MIMO (MU-MIMO) operation. If the RAN Scheduler is operating in MU-MIMO operation and decides that all serving users can be assigned to the same lower PRBs, DU/CU can turn off transmission on other sub-carriers thereby resulting in power saving. The lower PRBs assignment for MU-MIMO can be prioritized based on BWP and/or Slicing predefined priorities.

It is desirable to change required levels on the input power setting of the RF radio in response to feedback messages of detected input commercial power level changes or interrupts by the RF radio to reduce the operating RF radio power consumption. The RF radio operating power setting is reduced based on the immediate operational requirements, including determinations of the available RF service on the antenna/radio to provide for a prolonged operating time of airtime of the antenna reception and RF radio transmitter.

It is desirable to enable automated systems to reconfigure components based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to provide systems and methods that when the RF radio of the operating cell (i.e., gNB node) incurs a drop or interrupt of commercial power at the input to the base station the operational systems are altered to compensate for the loss of commercial power to a reduce RF radio current draw.

Wireless mobile communication technology uses various standards and protocols to transmit data between a base transceiver station (BTS) and a wireless mobile device. The deployment of a large number of small cells presents a need for energy efficiency power management solutions in fifth-generation (5G) cellular networks. While massive multiple-input multiple outputs (MIMO) will reduce the transmission power, it results in not only computational cost, but for the computation required, the input power requirements for transmission can be a significant factor for power energy efficiency (especially when operating in a backup mode) of 5G small cell networks. In 3GPP radio access networks (RANs) in LTE systems, the BTS can be a combination of evolved Node Bs (also commonly denoted as enhanced Node Bs, eNodeB s, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

The power consumption of base stations (BSs) is classified into three types, which are transmission power, computational power, and power for base station operation. The transmission power is the power used by the power amplifiers (PAs) and RF chains, which perform the wireless signals change, i.e., signal transforming between the baseband signals and the wireless radio signals. The computation power represents the energy consumed at baseband units (BBU's), which includes digital single processing functions, management, and control functions for BSs and the communication functions among the core network and BSs. All these operations are executed by software and realized at semiconductor chips. The additional power represents the power consumed for maintaining the operation of BSs. More specifically, the additional power includes the power lost at the exchange from the power grid to the main supply, at the exchange between different direct current to direct current (DC-DC) power supply, and the power consumed for active cooling at BSs.

Power loss and outages are commonplace in networks today as a result of natural disasters, rolling brownouts, etc. Base stations include backup power (e.g., batteries), these forms of backup power may not provide sufficient power during lengthy AC power outages, use of commercial wireless communications services may increase due to users' needs and/or desires.

Operating the BS in a sleeping mode can be a way to reduce energy consumption in cellular networks; however, this method focuses on the output power and does not consider a loss or interrupt of the commercial power on the input to the B.S. Hence, queueing decision techniques for BS sleeping techniques while can maximize energy-efficient utilization of the BS s in a green communication network are not applicable when commercial power is lost to the BS.

The physical or network node either represents an access node (e.g., Radio Distributed Units) or a non-access node (e.g., servers and routers), while a physical link represents an optical fiber link between two physical nodes. Every physical node is characterized by a set of available resources, namely computation (CPU), memory (RAM), and storage, which define the load characteristics of a cell. Each physical link is characterized by a bandwidth capacity and a latency value, which is the time needed by a flow to traverse that link. Finally, both physical nodes and links have associated utilization power requirements for each type of available resource.

The power delivery to a BS is rectified and regulated to a nominal measured DC voltage 48 (i.e., voltage direct current (VDC)), which is fed to a backup battery or a set of backup batteries for charging. The rectifier unit includes circuitry to keep the batteries fully charged and ready in case of a commercial power interrupt or failure. At full charge, the backup battery is kept at a voltage in the vicinity of 50 volts. Also, the vendors/operators may opt for a DC voltage of −24V or other DC voltage setting and not the typical 48V setting. The battery pack parameter in general per customer's requirement is in the order of 2-hour work time or other operator backup time settings (e.g., the operators may choose a 2-hour battery backup, 4-hour or 8-hour . . . as desired or required for operations) under 100 W (in this case, the power is calculated per RU power consumption and is a variable quantity . . . ) AC system, 48.1V/65Ah battery that can last for about 150 minutes with a full load.

Base stations typically use a 48V input supply that is stepped down by DC/DC converters to 24V or 12V, which can be reduced to meet the DC voltage level of each module.

In the 3GPP specification, the receive and transmit bandwidth of a UE can be adjusted to a subset of total cell bandwidth referred to as BWP. The bandwidth can be configured to shrink during a period of low activity for power reduction, and also the bandwidth location can be changed to allow different services. In an exemplary embodiment, the bandwidth adaption can be achieved by configuring the UE with BWP(s) informed to the UE of which of the configured BWPs is currently active one.

Figure 1:
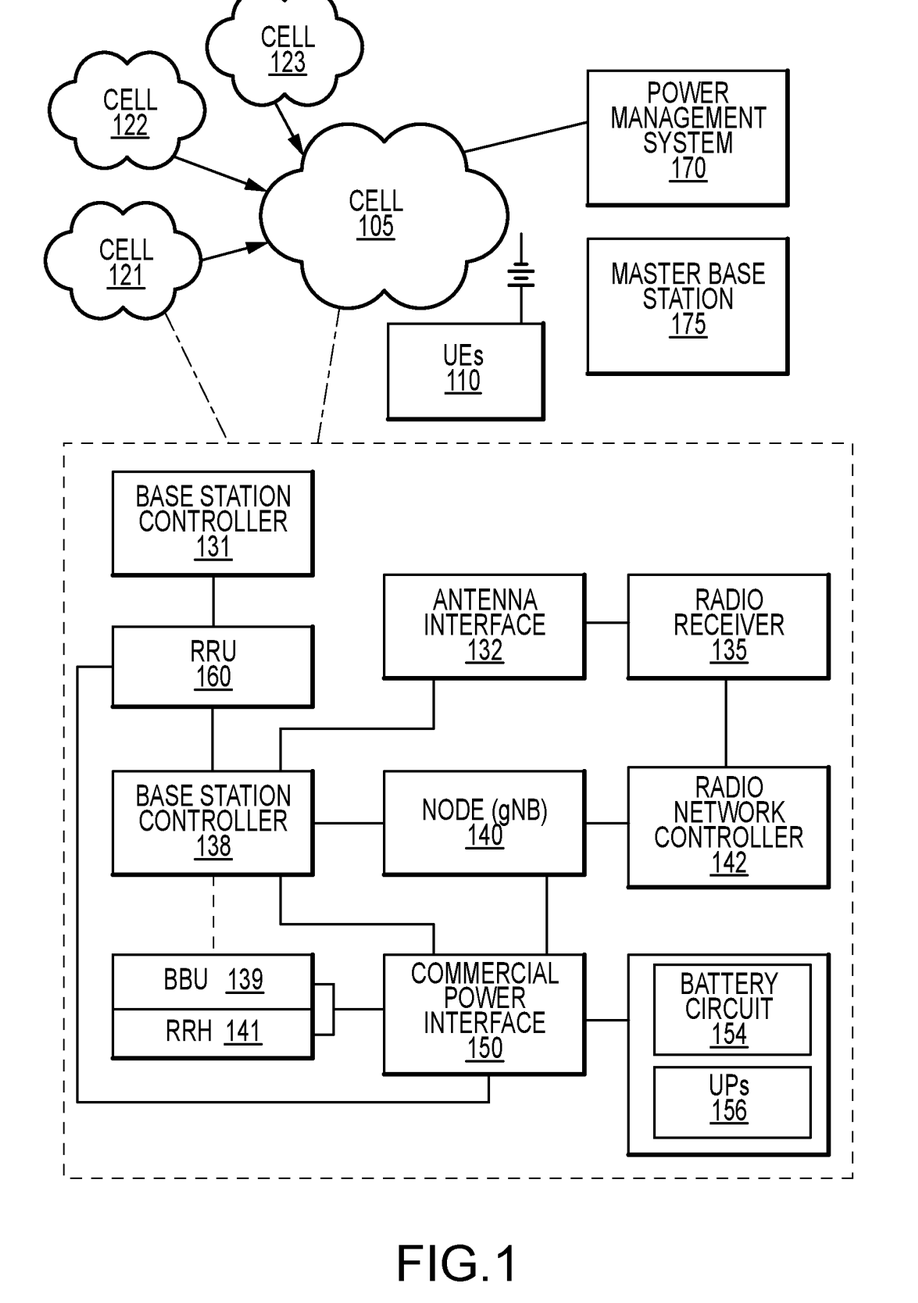
FIG. 1 illustrates an exemplary diagram of components in a base station of the base station power management system in a wireless data networking environment in accordance with various embodiments.

FIG. 1 shows a graphical representation of a 5G or other data network 100 that includes multiple cells 121, 122, 123 that provide access to a network 105 for any number of UE devices 110. Although FIG. 1 shows only one user equipment (UE) device 110 for simplicity, in practice the concepts described herein may be scaled to support environments 100 that include any number of devices 110 and/or cells 121-123, as well as any sort of network architecture for assigning bandwidth to different slices and performing other tasks, as desired.

In the example of FIG. 1, a mobile telephone or other user equipment (UE) device 110 suitably attempts to connect to network 105 via an appropriate access cell 121, 122, 123. In the illustrated example, each cell 121 includes the components for transmission of a base station controller 131, a base station transceiver 138, a node 140, an RF Radio 135, a Radio Network controller 142; the linking components of the antenna interface 132 and the antenna 133; and the power components of the commercial power interface 150, the backup power supply 152 of a battery circuitry 154 and UPS or batteries 156. The The commercial power interface 150 may receive power AC power from a public utility or other sources. The antenna 133 and antenna interface 132 control the signal to the UEs 110. The radio network controller 142 can control the RF transmit output via the RF radio 135 to conserve power usage to reduce the power draw on the USP 156. By reducing the communication bit rate, the RF power can be reduced in decibels ("dB"). Additionally, step reductions can be implemented. The battery circuit 154 can be configured as a rectifier type switch that can switch the output power from the UPS 156 at multiple levels. The Base Station controller 138 can include power control features to control the power drawn by the base station 138. Additionally, the base station controller 138 can communicate wirelessly with a power management system 170 that can confirm the AC power outage or interrupt on the front end to change the power input power levels of multiple small cells 121, 122, and 123, and a number of UEs 110 connected to the Node 140 and resources in a slice of a node (gNB).

In an exemplary embodiment, UEs 110 can be configured with a maximum of 4 BWP for Downlink and Uplink, but at a given point of time, only one BWP is active for downlink and one for uplink. The BWPs can be configured to enable each of the UEs 110 to operate in a narrow bandwidth, and when the user demands more data (bursty traffic), it can inform gNB to enable full bandwidth. When gNB configures a BWP, it includes parameters: BWP Numerology (u) BWP bandwidth size Frequency location (NR-ARFCN), CORESET (Control Resource Set). For Downlink, UE is not expected to receive PDSCH, PDCCH, CSI-RS, or TRS outside an active bandwidth part. Each DL BWP includes at least one CORESET with UE Specific Search Space (USS) while Primary carrier at least one of the configured DL BWPs includes one CORESET with common search space (CSS). For the uplink, UE 110 shall not transmit PUSCH or PUCCH outside an active bandwidth part. UEs 110 are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap In an exemplary embodiment, the radio network controller 131 can implement logic is implemented with computer-executable instructions stored in a memory, hard drive, or other non-transitory storage of device for execution by a processor contained within. Also, the radio network controller 131 can be configured with a remote radio unit (RRU) 160 for downlink and uplink channel processing. The RRU 160 can be configured to communicate with a baseband unit (BBU) 139 of a base station controller 131 via a physical communication link and communicate with a wireless mobile device via an air interface.

In various alternate embodiments, the base station 138 can be separated into two parts, the Baseband Unit (BBU) 139 and the Remote Radio Head (RRH) 141, that provides network operators to maintain or increase the number of network access points (RRHs) for the node (gNB), while centralizing the baseband processing functions at a master base station 175. Using a master C-RAN base station 175, the power management system, 170, can be instructed to coordinate operations in the tangent of power levels of multiple cells (121, 122, and 123).

Figure 2:
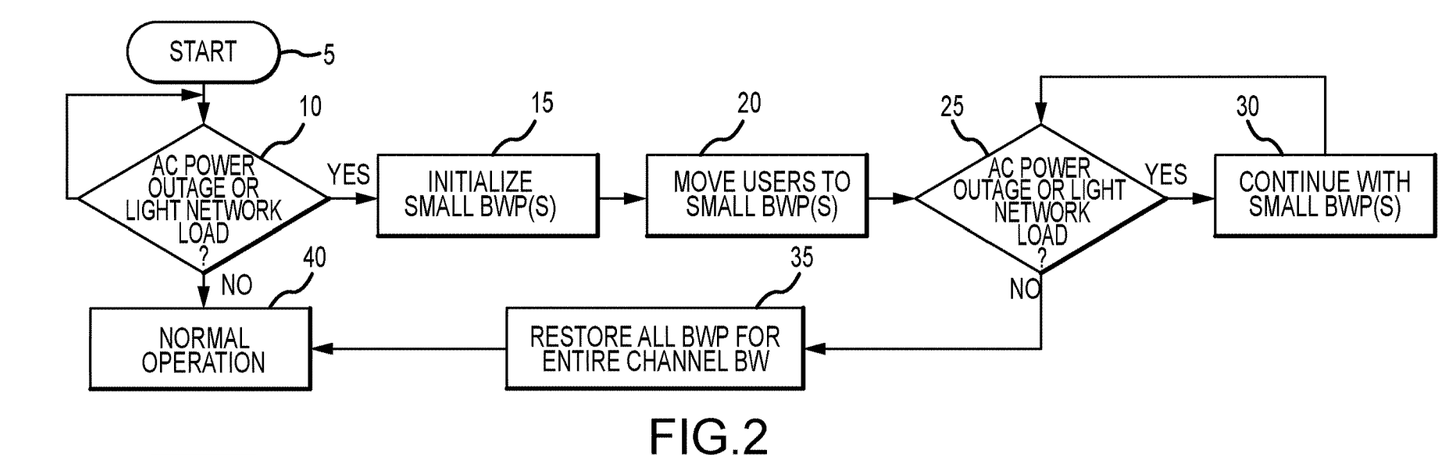
FIG. 2 illustrates an exemplary diagram of a feedback communication loop for power management of a base station responsive to a commercial power interrupt or failure of the base station power management system in a wireless data networking environment in accordance with various embodiments.

FIG. 2 is an exemplary flow diagram of a smart bandwidth adaptation call flow of the smart bandwidth (BW) adapter controller in accordance with various embodiments. In FIG. 2, initially at step 5, the smart BW control is enabled or always configured in on-state monitoring for a AC power outage or light network load. At step 10, detection by the BW adapter controller is made as to whether a change in state is occurring of a AC power outage or light network load. For example, a feedback communication loop for power management of a base station responsive to a commercial power interrupt or failure of the base station power management system in a wireless data networking environment. Radio AC power outage detection by distribution unit (DU) or central unit (CU) connected to the 5G network.

The Distributed Unit (DU) or Central Unit (CU) or management function (NFMF) can also detect AC power outage by using the network model of Fault, Configuration, Accounting, Performance, Security (FCAPS) and activate the appropriate solution. For example, during a AC power outage, the RF radio will notify to the control unit DU/CU and the DU/CU units will initiate moving of all or nearly all of the user traffic to the designated lower BWP(s) (e.g., initial BWP) while shutting down all or almost all of the other BWP in the current operating carrier.

Next, if there is determined that there is a AC power outage or light network load at the node, then at step 15, the small BWP(s) will be initialized. The initial active small BWP(s) are for a UE during the initial access until the UE is explicitly configured with BWPs during or after the establishment of the RRC connection. The initial active BWP is the default BWP unless configured otherwise.

At step 20, move or assigns users to small BWP(s). For example, based on the network configuration, the DU/CU may move all or nearly all the users and/or slices to the smaller BWP(s) during the AC power outage or during the light network load to minimize power consumption. The gNB will notify the UEs of the change in the assigned BWP. The UEs will cease to monitor the current BWP and will switch to immediately monitoring only the lower BWP. In a multi-carrier operation, the DU/CU can also move all the traffic to a single carrier based on BWP and/or slice prioritization configurations.

The reduction from a wider bandwidth has a direct impact on the peak, and users experienced data rates. By operating UEs with smaller BW than the configured CBW, reduces power and still can allow support of the wideband operation. At step 25, the adaptive bandwidth module continues to monitor for an AC power outage or light network load if the commercial power is resumed then at step 35, the BWP is restoring for the entire channel. After full power restores or loading on the RAN has increased, gNB can re-activate all the dedicated BWP and/or slices and move the users seamlessly to their respective BWP and/or slice(s).

At step 40, the normal operation is resumed again, and the power consumption levels are raised. Alternately, at step 25, if there is still determined to be an AC power outage or light network load, then at step 30, the feedback operation occurs to delay restoring the normal operation with all the BWPs for the entire channel BW The node is still placed in a limited operational state configured with the small BWP(s), and the BW adaptive unit continues to wait for the resumption of the commercial power or increased loads.

The reduced bandwidth operations and the corresponding assignments to the UEs can also occur in a Multi-User MIMO (MU-MIMO) operation if a RAN Scheduler is operating in MU-MIMO operation and decides that all or nearly all of the current serving users can be assigned to the same lower physical resource blocks (PRBs). In this case, the DU/CU units can shut off the current transmission that is occurring on other sub-carriers (i.e., each PRB can consist of up to 12 subcarriers) which will also result in power savings of the BS The lower PRBs assignments for MU-MIMO can also be prioritized based on the BWPs active and/or the slicing priorities that have been predefined.

Figure 3:
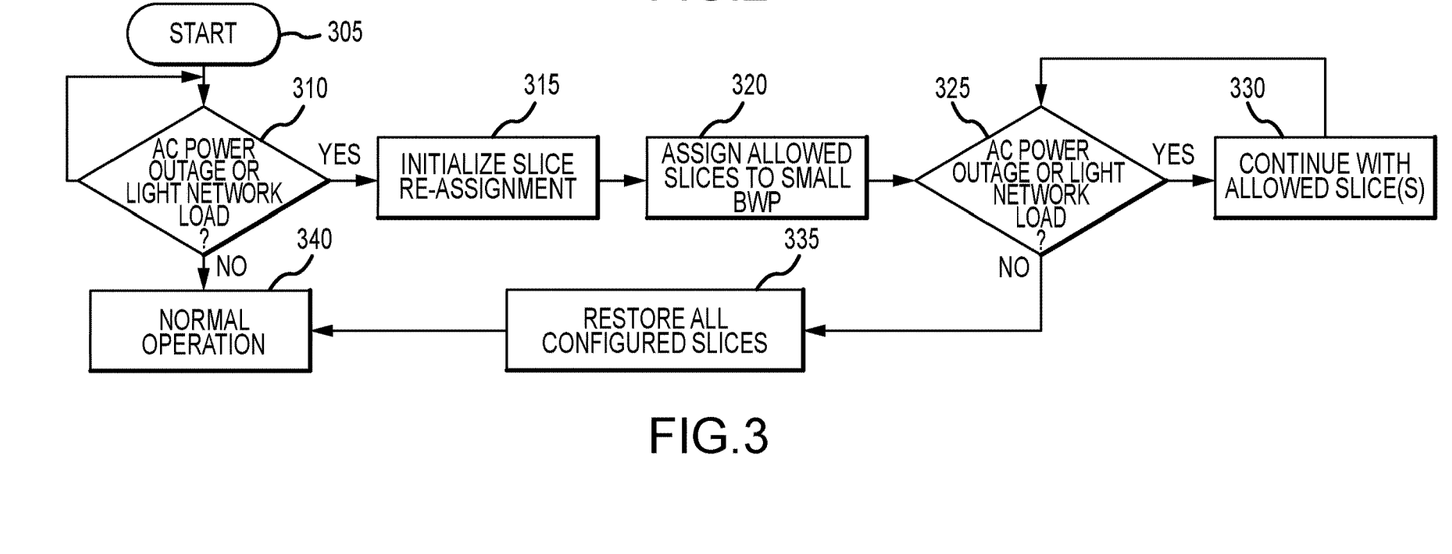
FIG. 3 illustrates an exemplary flowchart for power management of a base station responsive to a commercial power interrupt or failure of the base station power management system in accordance with various embodiments.

FIG. 3 is an exemplary flow diagram of a smart bandwidth adaptation call flow of the smart bandwidth (BW) adapter controller in accordance with various embodiments. In FIG. 3 at step 305, in the smart BW adaptation call-flow, like in FIG. 2, the BW adapter controller is initiated, and at step 310 determines whether a change in state is occurring of an AC power outage or light network load is being operated at the node. If the determination is in the affirmative, then at step 315, the initialize slice reassignment process takes place. At step 320, various slices are reassigned to small BWPs from their current slice assignments. The network slicing is configured that each active slice is tied to respective BWPs which enable during the AC power outage or light network load the systematic automated transfer of each active slice to a BWP in a scheduled order to reduce the power consumption by the UEs accessing the gNB by preconfigured slice control and BWP association For example, an operator can choose to merge all the active slices in the network or at a node into smaller BWPs. The operator may choose to define profiles, settings, etc. . . . . of each BWP that make up the BW and also alternative slice mappings for assignment during the power interrupt, AC power outage, light network load, etc. and this can be beneficial when there are multiple BWP that can be defined for usage in such conditions when the full BW is not needed or when power savings are desired. The offering or selections can be assigned all at once, incrementally, and also can be reassigned to normal operation in a likewise manner. The operator also can simply choose to close some slice offerings when desired and continue to enable only certain higher priority slice(s) for access by premium, or both premium and non-premium used. Further, usage can be selected for an entire preset period or configured for a given duration to select user sets. In step 325, the BW controller adaptor like in FIG. 2, continues to check whether the commercial power has not been restored and, if not, then continues via step 330 with the configured mapped slices selected for reduced power or load operations. At step 335, once the commercial power is resumed or the load is increased beyond a certain threshold, all the slices that have been prior or can be enabled without the prior restrictions will be restored, and normal operations will be restored to all the UE's given access.

Figure 4:
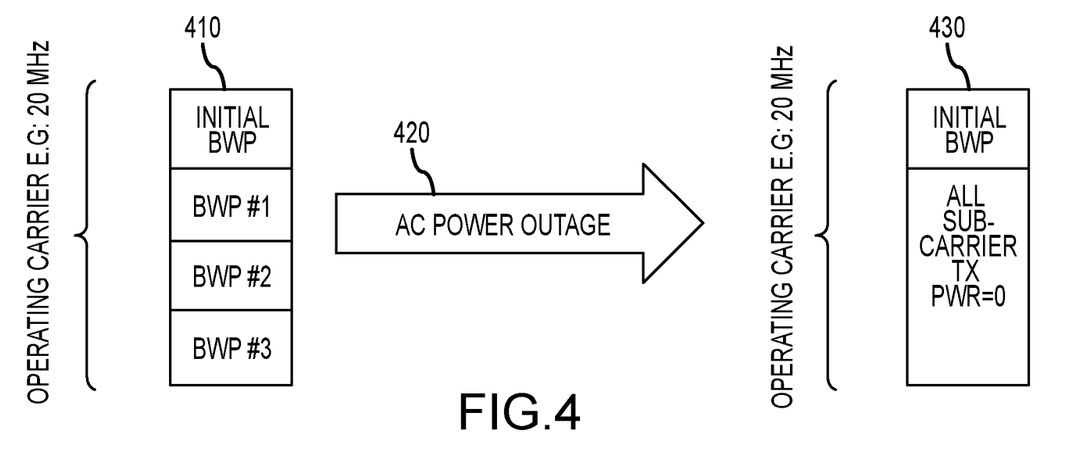
FIG. 4 illustrates a flowchart of an example automated selection process for reducing slice access failures in accordance with various embodiments.

FIG. 4 illustrates a functional diagram of BWP parts before and after an AC power outage of an exemplary smart BW adaptation call-flow in accordance with various exemplary embodiments. In FIG. 4, in an exemplary embodiment, there is shown an operating carrier (e.g., 20 MHz) with a BWP arrangement 410 before the AC power outage that includes an arrangement of four parts of a set that include (a) an initial BWP, (b) a BWP assigned a number 1, (c) a BWP assigned a number 2, and (d) a BWP assigned a number 3 that make up the entire BWP used by all the UE during the initial access and the dedicated BWP for a UE or group of UEs that is used for the data allocation by gNB (i.e., RAN+DU/CU). Also, each BWP 1-3 as well as the initial BWP can contain multiple smaller BWP(s) (not shown). In various alternative embodiments, the multiple smaller BWP (s) can be predefined by the operator for use in the arrangement during the AC power outage (420). Alternately, the BWP(s) 1-3 can be gradually reduced in the operating BWP. For example, a step approach in reduction can be used, with 25% step increments in a reduction in the BW (i.e., converting particular BWP(s) to an inactive state) corresponding to a gradually lower number of BWP(s) used. With a step or gradual decrease in the number of BWP(s) active, the BW adaptor attempts to maintain a certain threshold of the quality of service (QoS) of the cell site when short AC power outages take place.

Figure 5:
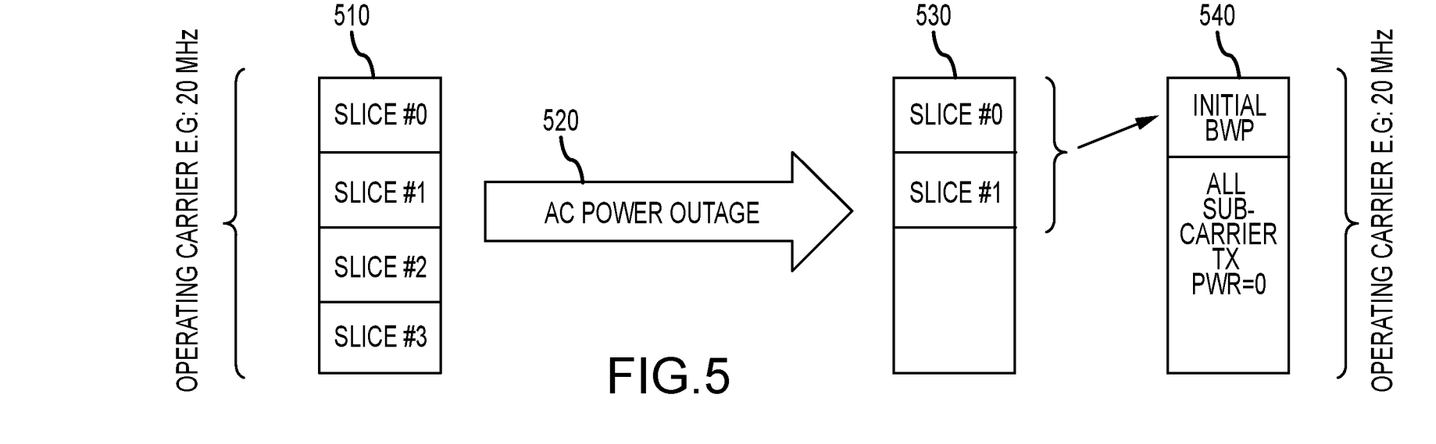
FIG. 5 illustrates a flow diagram of an exemplary slice arrangement before and after a AC power outage in accordance with various embodiments.

FIG. 5 illustrates a flow diagram of an exemplary slice arrangement before and after an AC power outage in accordance with various embodiments. In FIG. 5, there shown a slice arrangement 510 with the operating carrier (e.g., 20 MHz) which is an arrangement of 4 slices at a gNB node before an AC power outage 510, in this case, the slice arrangement is made up of a set of 4 slices of (a) slice assigned a number zero, (b) a slice assigned a number 1, (c) a slice assigned a number 2, and (d) a slice assigned a number 3. After the AC power outage 520, slice arrangement 530 is reconfigured into two slices of (a) a slice assigned a number zero and (b) the slice assigned a number 1. In this case, the slices numbered 1-2 correspond to the reconfigured BWP(s) and specifically to the operating carrier (e.g., 20 MHz) of the BWP part of (a) an initial BP, and the remaining slices are assigned to "all sub-carrier TX with Pwr=0", in other words in an inactive mode. As illustrated at 540, the network slicing of an exemplary embodiment of slice #0 and slice #1 can be tied to the initial BWP. This will enable keeping enabled slice #0 and slice #1 in the initial BWP. Hence, there is a two-fold power saving by select slices (i.e., slice #0 and slice #1) and also by the use of only the initial BWP for the selected slices. That is, all the other sub-carriers BWP are shut off–Tx Pwr=0. The operating carrier frequency, in this case, remains the same as 20 MHz. Therefore during an AC power outage or light network load, power consumption is minimized first by the slices enabled and then by the BWP (initial BWP) assigned (i.e., the process of merging all the slices in a smaller BWP). The operator can define other BWPs and another slice mapping as desired. It is contemplated that the depicted implementation of merging slices into the initial BWP is one of a variety of ways that moving users to small BWPs and assigning slice offerings tied to the BWP can be performed to achieve power savings.

In an exemplary embodiment, from a network standpoint, a mixed deployment can be implemented. For example, an exemplary deployment may be where i) certain cells support slices assigned numbers (0&1) for premium users with higher power usage and higher transmission rates which are assigned to different frequencies than slices 2&3 of macro/public cells of lower transmission rates and subsequently lower power usage, and ii) certain cells will continue ordinarily when there is no AC power outage be supporting both sets of slices (0&1) and (2&3). Hence, because of the AC power outage, some cells that would ordinarily be fully active for premium and non-premium slice access of slices (0&1) and (2&3), respectively, are not enabled. In other words, there would not be any cells that are fully slice enabled, and all the available cells would have reduced functionalities with not all the slices enabled, which in turn will result in power consumption reductions as well as limited slice access with preference to premium users.

In an exemplary embodiment, if a premium user is camped on a cell that is not a macro cell but does not offer slices 2&3 because of a reduced number of slices enabled (ordinarily slices 2&3 would be accessible) due to the AC power outages. In this case, while ordinarily, the user's UE will frequently not attempt to access slices 0&1, if the slices 2&3 are not available on another cell because of the AC power outage, the UE ability to reselect to another cell will be modified, and the UE will initiate an attempt to access the available slices 0&1 at the current cell which the UE is camped.

Figure 6:
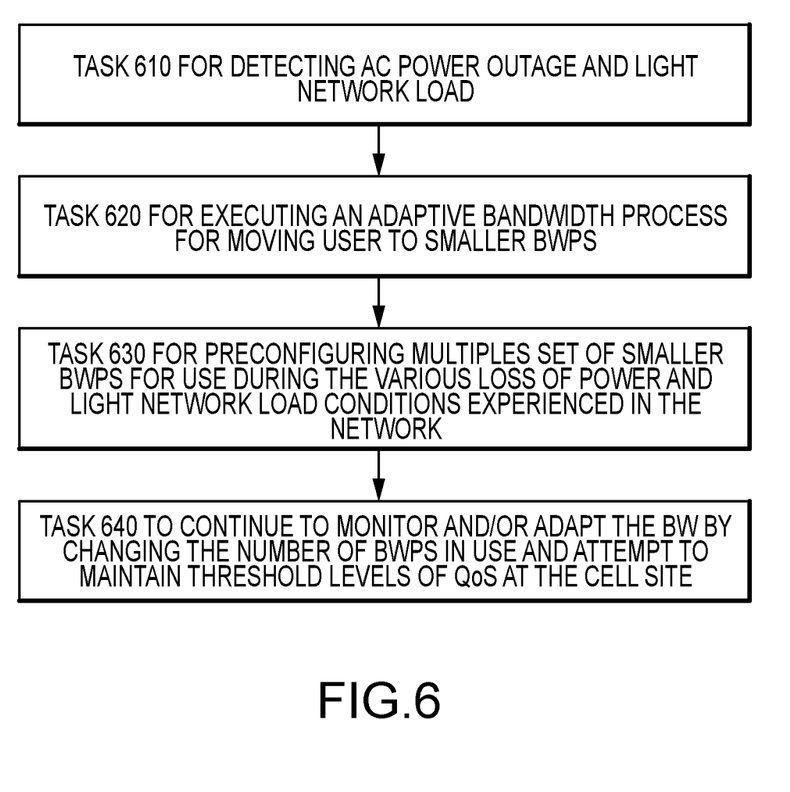
FIG. 6 illustrates an exemplary flowchart of reassigning users into smaller BWPs responsive to AC power outages, power interrupts, or network loads in accordance with various embodiments.

FIG. 6 illustrates an exemplary flowchart of reassigning users into smaller BWPs responsive to AC power outages, power interrupts, or light network loads in accordance with various embodiments. In FIG. 6, at task 610, an AC power outage is detected or it is determined in response in a variety of ways, for example via feedback (i.e., messages) communicated and received by the Base Station controller of an impending AC power interrupt or AC power outage detected in another part of the network or from the monitoring of the input current to the current Base Station. As a result, at task 620, the adaptive Bandwidth solution is executed for changing the current BWP configuration to a new smaller BWP configuration. For example, the Base Station may be currently operating via a carrier of a select frequency (e.g., 20 MHz) with a complementary BWP arrangement of four BWP parts of an initial BWP and other BWPs (1 to 3) that currently make up the entire BWP in use for the UE (i.e., essentially all of the UEs in use) connected with the initial access, or the dedicated BWP for a UE or group of UEs that is currently in use for data allocation by the gNB (i.e., RAN+DU/CU). Also, in each of the initial BWP plus BWPs, 1-3 can contain multiple smaller BWP(s). At task 630, a multiple set of smaller BWP(s) can be preconfigured for use during the AC power outage, light network load or power interrupt type conditions that are occurring. The number of BWP(s) 1-3 is used can also be incrementally decreased. With each incremental decrease in the number of BWPs in use, at task 640, the input power, loading, and communications of network power interrupt can also be monitor by the BW adaptor to modulate the number of BWPs in use (i.e., continue to decrease or increase the number of active BWPs) and to keep a certain threshold of the QoS of the cell site during the changed power or load conditions.

Figure 7:
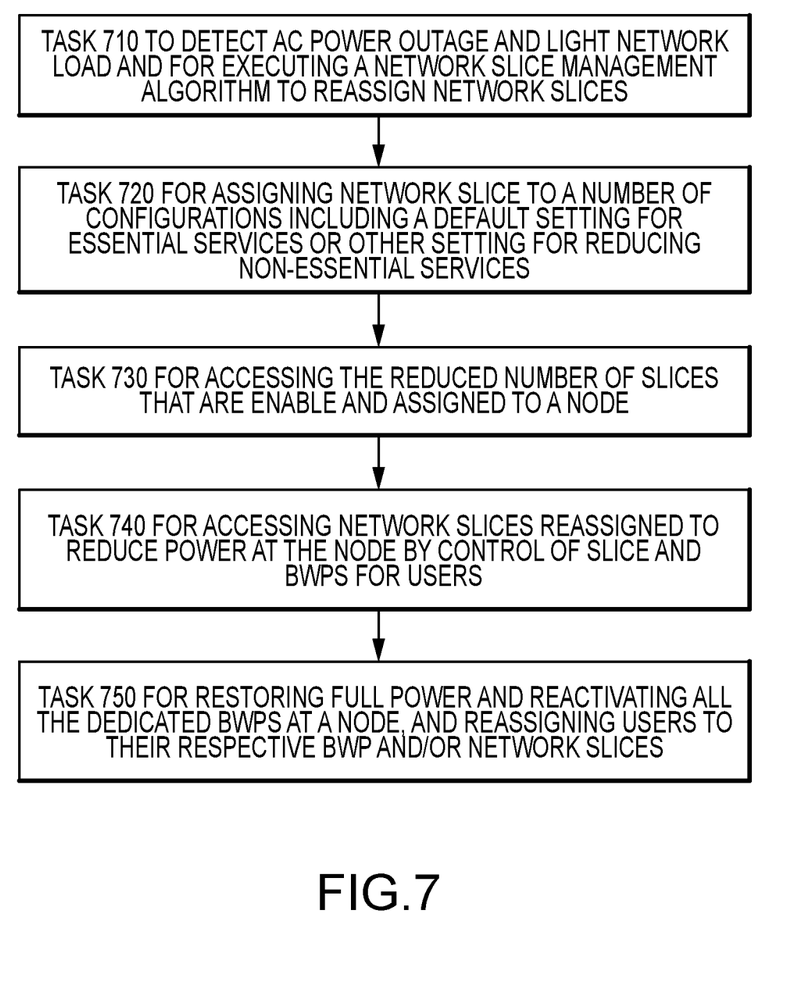
FIG. 7 illustrates an exemplary flowchart of network slicing responsive or tied to AC power outages, power interrupts, or light network load conditions in accordance with various embodiments.

FIG. 7 illustrates an exemplary flowchart of network slicing responsive or tied to AC power outages, power interrupts, or light network load conditions in accordance with various embodiments.

In the flowchart of FIG. 7, at task 710, an AC power outage is detected. Also, a lower input power or load consumption (i.e. light network load) may also be detected or determined in the network, and a network slice management algorithm is executed by the BW adaptor to lower slice assignments at the gNB node connected to the Base Station. For example, at task 720, the slice assignments may be assigned to a default setting for essential services or subsequent assignments for reducing non-essential services. At task 730, the access to the reduced number of slices that are in use and assigned at the gNB can be balanced for access between premium and non-premium enterprise users, with the premium enterprise users given preferential non-essential services so long as QoS can be met. For example, in one scenario, with two sets of available slices, each set may be of slices that can have an initial configuration of essential services (and only one set having access to non-essential services) in which premium enterprise users may be assigned access to both sets of slices. The available set of slices with both essential and non-essential services are then shed in a priority scheme of assigning access to premium users. The non-premium users are only given less prioritized access and therefore, can only access essential services that can be shed on a different priority scheme while maintaining an appropriate level of QoS. At task 740, the access and power use of the premium and the non-premium user can be reconfigured to minimize power consumption gNB from the control of the slice and BWP association. The operator may select to merge all the available slices at the gNB node into smaller BWPs. In another example, the operator may choose to define the BWP and slicing mapping during an AC power outage when there are multiple BWP defined to be used during AC power outages. Also, the operator can choose to close some slice offerings and continue only higher priority slice(s)

At task 750, after full power restores or loading on the RAN has increased, gNB can re-activate all the dedicated BWP and/or slices and reassign the users seamlessly to their respective BWP and/or slice(s). The reduced bandwidth assignment at the UE can be done in a Multi-User MIMO (MU-MIMO) operation. That is, if the RAN Scheduler is operating in MU-MIMO operation and decides that all serving users can be assigned to the same lower PRBs, DU/CU can turn off transmission on other sub-carriers thereby resulting in power saving. The lower PRBs assignment for MU-MIMO can be prioritized based on BWP and/or slicing predefined priorities.

Figure 8:
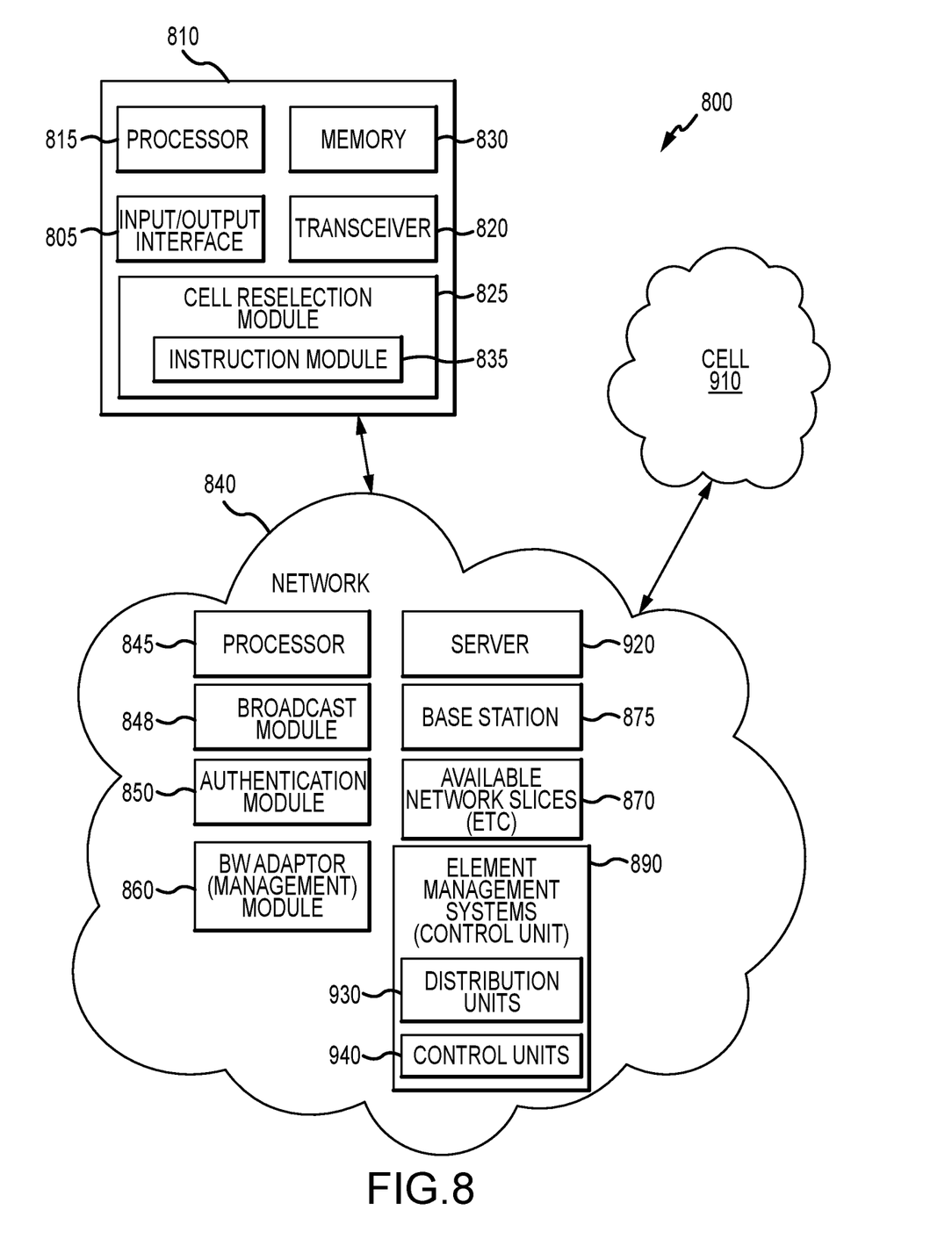
FIG. 8 illustrates a diagram of an example user equipment (UE) and network architecture, for example, an automated process for reducing power consumption in accordance with various embodiments.

FIG. 8 is an exemplary illustration of a UE and network configuration in accordance with an embodiment. The UE 810 includes a processor 815 for performing various logic solution functions for registering and receiving broadcast system information, initiating PDU sessions performing cell selections and reselections, ranking neighboring cells, configuring different modes of operation of the UE, etc. . . . . The UE 810 may include cell reselection module 825, input/output interfaces 805, memory 830 for storing measurement reports, rankings data of neighboring cells, and a measurement module 835 for calculating by various solutions distances and other criteria for neighboring cells, etc. . . . and for accessing cells within the vicinity for the premium and non-premium users. The network 840 may include a base station 875, processor 845 for registering UE for slice access, cell ID modules 855, broadcast module 848 for broadcasting slice ID, slice offset values for neighboring cells and other system information, authentication module 850 for authenticating a UE, network slices 870, etc. . . . and a BW adaptation module 860. The UE 810 communicates with the network and reads broadcasted system information at a cell 910 in which the UE 810 is camped in an idle mode. For example, if the UE 810 is camped at a cell A, then the UE 810 would receive slice IDs and slice offset values for neighboring cells of cell A via the transceiver 820 and process the information via the processor 815 to perform measurements and calculate using cell reselection equations of the cell reselection module 825 (e.g., using a cell reselection logic or process) to select a next cell where the cell reselection process is based on a ranking of the neighboring cells.

The BW adaptation module 860 (i.e. BW management unit) can communicate via element management systems (EMS) 890 (i.e. control unit) to direct various logic components by an automated workflow of the cell 910 of the parts (shown in FIG. 1) of the radio receiver, the UPS, battery circuit (i.e., DC power supply), the cell site (i.e., node) calls/dropped calls/throughput in operation, the server. The EMS 890 monitors via the distribution units (DUs) 930 and the central units (CUs) 940 the various nodes and cells in the network and controls or send instructions to the various components of the cell 910 to maintain the quality of service (QoS) of the cell site. The automated workflow maintains the network availability and monitors the status of network devices, including the commercial power supplied to the network. The EMS 890 can also be connected to multiple eNodeB for power management. When an AC power outage in the network occurs, the automated workflow which is monitoring the network instructs the EMS 890 via various logic components to reduce the output power of the radio receiver and also takes into account other factors by communicating with the radio receiver, cell site via a router (or another communication link) connected to the server 920 in reducing the output power for transmission. This, in turn, reduces the DC power and the draw on the UPS.

In an exemplary embodiment, the server 920 can be configured as NB-IoT Server is a software for data collection and monitoring and communicating via the router for activating the automated workflow via the EMS 890 and can display the log messages of each base station and the survival status of all sessions (including information such as signal, power, etc.).

After the detection of an interrupt of the commercial power, power failure, power loss, and/or AC power outage of the network, the automated workflow, which is monitoring the components and the network, detects the change and the power loss. The automated workflow in response to the detected power loss implements the configuration management functions via the BW adaptation module 860 of slice assignments, and available BWPs at cell 910. The EMS 890 communicates with the radio receiver, the server 920, and other components associated with the cell site, to send messages via the cell site router to receiver collect cell statistics, and to execute appropriate plug and play functionality of the base station radio receiver. The automated workflow executes various functions to the element management system based on decisions from the BW adaptation module 860 and data from the cell site and base station.

As described, a power management system includes several data processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A system for adaptive network slice management, comprising:
  an element management control unit that comprises a set of distribution and central units (DU/CU) to monitor power and traffic loads at a plurality of cell sites in a network;
  a slice management unit configured to manage a set of network slices at the plurality of cell sites, and to determine based on information about power and traffic loads received from the element management control unit, whether a change in state is occurring that will cause a power outage or light load operation at a node of at least one cell site of the plurality of cell sites; and
  in response to a determination of the change in state at the at least one cell site, the slice management unit configured to initiate a network slice reassignment process at the at least one cell site to reassign a set of network slices at the at least one cell site to smaller bandwidth parts (BWPs) wherein each reassigned network slice is tied to a respective BWP to enable a transfer of loads from a set of network slices in an active state at the least one cell site to a set of BWPs thereby reducing overall power consumption of a node which comprises the at least one cell site.

2. The system of claim 1, further comprising:
the slice management unit configured to:
enable by a default setting to maintain a number of network slice assignments in a set of network slices that are tied to essential services during the power outage; and
enable by the default setting to reduce the number of set of network slice assignments in the set of network slices that are tied to non-essential services during the power outage.

3. The system of claim 2, wherein the slice management unit is configured to enable non-premium users to be given less prioritized access thereby limiting available access by user equipment to essential services and shedding essential services that were made available to the non-premium users on a priority scheme.

4. The system of claim 3, wherein the priority scheme for shedding essential services is different for the priority scheme provided to a premium user for shedding essential services, wherein the priority scheme still continues to maintain an appropriate level of quality of service (QoS) to users.

5. The system of claim 4, wherein the slice management unit is configured to balance access to a reduced number of slices in use and assigned at the node between premium and the non-premium users, with the premium users given preferential non-essential services so long as a required quality of service is achievable.

6. The system of claim 5, wherein the slice management unit is configured to enable access and power use of the premium and the non-premium user which is reconfigured to minimize power consumption at the node by control of each network slice tied to the BWP.

7. The system of claim 6, wherein the slice management unit is configured to enable selective closure of a number of network slice offerings, and to continue, in a prioritized scheme to enable a first set of higher priority network slices for access by premium users, and a second set of higher priority network slices for access by both premium and the non-premium users.

8. The system of claim 7, wherein the slice management unit is configured to enable access to the set of premium users, and the set of non-premium users for an entire preset period or for a selected duration.

9. A method for adaptive bandwidth (BW) management, comprising:
configuring an element management control unit comprising a set of distribution (DU) and central units (DU/CU) for monitoring power and traffic loads at a plurality of cell sites in a network;
managing, by a slice management unit, a set of network slices at the plurality of cell sites, and determining based on information about power and traffic loads received from the element management control unit, whether a change in state is occurring that will cause a power outage or light load operation at a node of at least one cell site of the plurality of cell sites; and
in response to a determination of the change in state at the at least one cell site, initiating by the slice management unit, a network slice reassignment process at the at least one cell site for reassigning a set of network slices at the at least one cell site to smaller bandwidth parts (BWPs), wherein each reassigned network slice is tied to a respective BWP to enable a transfer of loads from a set of network slices in an active state at the least one cell site to a set of BWPs thereby reducing overall power consumption of a node which comprises the at least one cell site.

10. The method of claim 9, further comprising:
maintaining, by the slice management unit by a default setting, a number of network slice assignments in a set of network slices that are tied to essential services during the power outage; and
reducing, by the slice management unit by the default setting, the number of set of network slice assignments in the set of network slices that are tied to non-essential services during the power outage.

11. The method of claim 9, further comprising:
enabling, by the slice management unit, non-premium users to be given less prioritized access thereby limiting available access by user equipment to essential services and shedding essential services that were made available to the non-premium users on a priority scheme.

12. The method of claim 11, wherein the priority scheme for shedding essential services is different for the priority scheme provided to a premium user for shedding essential services, wherein the priority scheme still continues to maintain an appropriate level of quality of service (QoS) to users.

13. The method of claim 12, further comprising:
balancing, by the slice management unit, access to a reduced number of slices in use and assigned at the node between premium and non-premium users, with the premium users given preferential non-essential services so long as a required quality of service is achievable.

14. The method of claim 13, further comprising:
reconfiguring, by the slice management unit, access and power use of the premium and the non-premium user to minimize power consumption at the node by control of each network slice tied to the BWP.

15. The method of claim 14, further comprising:
enabling, by the slice management unit, selective closure of a number of network slice offerings, and to continue, in a prioritized scheme to enable a first set of higher priority network slices for access by premium users, and a second set of higher priority network slices for access by both premium and non-premium users.

16. The method of claim 15, further comprising:
enabling, by the slice management unit, access to the set of premium users, and a set of non-premium users for an entire preset period or for a selected duration.

17. A computer program product tangibly embodied in a non-transitory, computer-readable storage device that stores a set of instructions that when executed by a processor perform a method for an operational mode of a base station when a power loss or light network load is detected, the method comprising:
configuring an element management control unit comprising a set of distribution and central units (DU/CU) for monitoring power and user traffic at a plurality of cell sites in the network;
managing, by the processor disposed in a slice management unit, a set of network slices at the plurality of cell sites, and determining based on information about power and traffic loads received from the element management control unit, whether a change in state is occurring that will cause a power outage or light load operation at a node of at least one cell site of the plurality of cell sites; and in response to a determination of the change in state at the at least one cell site, initiating by the processor, a network slice reassignment process at the at least one cell site for reassigning a set of network slices at the at least one cell site to smaller bandwidth parts (BWPs), wherein each reassigned network slice is tied to a respective BWP to enable a transfer of loads from a set of network slices in an active state at the least one cell site to a set of BWPs thereby reducing overall power consumption of a node which comprises the at least one cell site.

18. The computer program product of claim 17, wherein the method further comprises:
maintaining, by the processer, disposed in the slice management unit via a default setting, a number of network slice assignments in a set of network slices that are tied to essential services during the power outage; and
reducing, by the processor disposed in the slice management unit via the default setting, the number of set of network slice assignments in the set of network slices that are tied to non-essential services during the power outage.

19. The computer program product of claim 18, wherein the method further comprises:
balancing, by the processor, disposed in the slice management unit, access to a reduced number of slices in use and assigned at the node between premium and non-premium users, with the premium users given preferential non-essential services so long as a required quality of service is achievable.

20. The computer program product of claim 19, wherein the method further comprises:
controlling, by the processor disposed in the slice management unit, a cell site comprising a gNB node of the network by data from the DU/CU that enables monitoring of the power outage and light loads at the gNB node to initialize the network slice reassignment process.

* * * * *